United States Patent [19]
Bartholic

[11] Patent Number: 5,888,919
[45] Date of Patent: Mar. 30, 1999

[54] PROCESS FOR ZEOLITIC CATALYST REACTIVATION

[76] Inventor: David B. Bartholic, 75 Wetumpka La., Watchung, N.J. 07060

[21] Appl. No.: 758,159

[22] Filed: Nov. 25, 1996

[51] Int. Cl.$^6$ .............................. B01J 38/58; B01J 38/48; B01J 70/34
[52] U.S. Cl. .................... 502/22; 502/27; 502/33
[58] Field of Search ................ 502/22, 25, 27, 502/28, 33

[56] References Cited

U.S. PATENT DOCUMENTS

| | | | |
|---|---|---|---|
| 2,548,912 | 4/1951 | Savage | 196/52 |
| 3,647,718 | 3/1972 | Haden, Jr. et al. | 252/455 X |
| 3,703,886 | 11/1972 | Witzky | 123/32 |
| 4,678,764 | 7/1987 | Le et al. | 502/26 |
| 4,826,793 | 5/1989 | Velten | 502/64 |
| 5,188,995 | 2/1993 | Maholland et al. | 502/28 |

FOREIGN PATENT DOCUMENTS

| | | | |
|---|---|---|---|
| 0499258 A1 | 2/1992 | European Pat. Off. | B01J 29/38 |
| 0 499 248 A1 | 8/1992 | European Pat. Off. | B01J 29/38 |
| 0 499 258 A1 | 8/1992 | European Pat. Off. | B01J 29/38 |
| WO 97/24182 | 7/1997 | WIPO | B01J 29/90 |

*Primary Examiner*—Michael Lewis
*Assistant Examiner*—Alexander G. Ghyka
*Attorney, Agent, or Firm*—Finnegan, Henderson, Farabow, Garrett & Dunner, L.L.P.

[57] ABSTRACT

A spent zeolite-containing hydrocarbon cracking catalyst is treated by regenerating it to remove carboneous deposits. A portion of the regenerated catalyst is withdrawn from the circulating catalyst inventory of a hydrocarbon processing unit and slurried with a liquid containing an activating agent to solubilize and/or dislodge contaminants which block the pores of the zeolite and adversely affect the activity of the catalyst. The slurry is agitated to dissolve or dislodge the contaminants from the zeolite pores, and the agitated slurry, without being permitted to settle, is transferred to a fluidized drying zone where the liquid and solubilized and/or dislodged contaminants are removed from the treated catalyst which has a level of cracking activity higher than that of the catalyst in the circulating catalyst inventory. The treated catalyst is then recycled to the unit and contacted with a hydrocarbon feedstock under cracking conditions.

18 Claims, 1 Drawing Sheet

PROCESS FOR ZEOLITIC CATALYST REACTIVATION

FIELD OF THE INVENTION

This invention relates to process for improving the activity of fluid catalytic cracking (FCC) or moving bed cracking (TCC) catalyst, including any additives containing zeolitic material as one of the active components and which may be employed with each type catalyst, which process can be integrated with the operations of the hydrocarbon processing unit in which the catalyst is employed.

BACKGROUND OF THE INVENTION

Zeolites are very common materials in nature and there are many types of synthetic zeolites. It is estimated that there are about 100 types of synthetic zeolites and some of these are used in cracking catalysts. Examples of such cracking catalysts are those used in the well known fluid catalytic cracking (FCC) process and those used in the moving bed (TCC) process as described in U.S. Pat. No. 2,548,912. These types of catalyst contain crystalline zeolites, often referred to as molecular sieves, and are now used in almost 100% of the FCC and TCC type units, which process about 10 million barrels of oil per day.

Zeolites, or molecular sieves, have pores of uniform size, typically ranging from 3 to 10 angstroms, which are uniquely determined by the unit structure of the crystal. These pores will completely exclude molecules which are larger than the pore diameter. As formed in nature or synthesized, zeolites are crystalline, hydrated aluminosilicates of the Group I and Group II elements, in particular, sodium, potassium, magnesium, calcium, strontium, and barium, which can be exchanged with higher polyvalent ions, such as rare earths or with hydrogen. Structurally, the zeolites are "framework" aluminosilicates which are based on an infinitely extending three-dimensional network of $AlO_4$ and $SiO_2$ tetrahedra linked to each other by sharing all of the oxygens. The framework contains channels and interconnected voids which are occupied by the cation and water molecules. The cations are quite mobile and may be exchanged, to varying degrees, by other cations. Intercrystalline "zeolitic" water in many zeolites is removed continuously and reversibly. In many other zeolites, mineral and synthetic cation exchange or dehydration may produce structural changes in the framework.

As stated above, the uses for zeolites are many, but they typically must be combined with other materials when they are used in process applications. As an example, a synthesized zeolitic material, which is usually less than 4 microns in size, is combined with a binding agent, such as kaolin clay, silica sol, or amorphous silica, alumina, and zirconia as described in Demmel's U.S. Pat. No. 4,826,793 and then spray dried or extruded to produce a finished material that has the properties desired for the intended use. These properties may include attrition resistance, crush strength, particle size distribution, surface area, matrix area, activity and stability. Another method of producing a finished zeolite-containing product would be to produce the zeolite in-situ as described in Hayden's U.S. Pat. No. 3,647,718. While these patents deal mainly with FCC type catalyst, similar procedures are used in the production of zeolitic materials for TCC process applications. It is believed that in the manufacture of zeolitic moving bed and FCC type catalyst that some of the zeolite pores are blocked or buried within the matrix material and that the process described herein can remove this blockage and increase the available zeolite. So not only is the present process applicable to regenerated equilibrium catalyst, but it can also be used on the fresh zeolitic catalyst or additives before they are added to the FCC or TCC process for the first time.

An objective in refining crude petroleum oil has always been to produce maximum quantities of the highest value added products in order to improve the profitability of refining. Except for specialty products with limited markets, the highest value added products of oil refining with the largest market have been transportation fuels, such as gasoline, jet fuel and diesel fuels. Historically, a major problem in the refining of crude oil has been to maximize the production of transportation fuels. This requires a refining process or method which can economically convert the heavy residual oil, the crude oil fraction boiling above about 1000° F., into the lighter boiling range transportation fuels. A major obstacle to the processing of this heavy residual oil has been the concentration of refining catalyst poisons, such as metals, nitrogen, sulfur, and asphaltenes (coke precursors), in this portion of the crude oil.

Since most of the oil refineries in the world use the well known fluid catalytic cracking (FCC) process as the major process for the upgrading of heavy gas oils to transportation fuels, it is only natural that the FCC process should be considered for use in the processing of heavy residual oils. Indeed, this has been the case for the last ten to fifteen years. However, the amount of residual oil that a refiner has been able to economically convert in the FCC process has been limited by the cost of replacement catalyst required as a result of catalyst deactivation which results from the metals in the feedstock. The buildup of other catalyst poisons on the catalyst, such as the coke precursors, nitrogen and sulfur, can be effectively controlled by using catalyst coolers to negate the effect of coke formation from the asphaltene compounds, using regenerator flue gas treating to negate the environmental effects of feed sulfur, and using a short contact time FCC process, such as that described in my U.S. Pat. No. 4,985,136, to negate the effects of feed nitrogen, and to some degree, the feed metals.

For the past twenty or more years the most widely used FCC catalysts have been zeolitic catalysts, which are finely divided particles formed of a matrix, usually silica-alumina, alumina or the like, having a highly active zeolitic material dispersed in the matrix. As is well-known, the zeolites used in such catalysts are crystalline and typically have a structure of interconnecting pores having a pore size selected to permit the ingress of the hydrocarbon molecules to be converted, and the zeolite has a very high cracking activity. Therefore, the highly active zeolite is dispersed in a matrix having a lesser cracking activity in a ratio providing the desired activity for commercial use. Typically used zeolites are of the faujasitic type, e.g., X-, Y- or L- type synthetic zeolites, and from about 5 wt. % to about 70 wt. % of the zeolite is employed. Such zeolitic FCC catalysts, their manufacture and their use in the FCC process are well known by those working in the art.

It is commonly accepted in the oil refining industry that vanadium contained in the residual oil FCC feedstock will irreversibly deactivate the zeolite by attacking the structure, and that this vanadium effect is more pronounced at temperatures above about 1330 F. It is also commonly accepted that catalyst deactivation by hydrothermal deactivation or by metals (e.g., sodium and vanadium) attack is irreversible.

In the operation of an FCC process unit (FCU) the process economics are highly dependent upon the replacement rate of the circulating catalyst (equilibrium catalyst) with fresh catalyst including additives, such as ZSM-5 and other zeolitic materials used for specific purposes in the FCU. Equilibrium catalyst is FCC or TCC catalyst which has been circulated in the FCU or TCC unit between the reactor and regenerator over a number of cycles. The amount of fresh catalyst addition required, or the catalyst replacement rate, is determined by the catalyst loss rate and that rate necessary to maintain the desired equilibrium catalyst activity and selectivity to produce the optimum yield structure. In the case of operations wherein a feedstock containing residual oil is employed, it is also necessary to add sufficient replacement catalyst to maintain the metals level on the circulating catalyst at a level below which the yield structure is still economically viable. In many cases, low metal equilibrium catalyst with good activity is added along with fresh catalyst to maintain the proper catalyst activity at the lowest cost.

In the processing applications that utilize zeolites, the material must be replaced as it looses its ability to perform the desired function. That is, the zeolitic material deactivates under the conditions employed in the process. In some cases, such as FCC and TCC type catalytic applications, fresh zeolitic material, in this case zeolitic catalyst or additives such as ZSM-5 (described in U.S. Pat. No. 3,703,886), are added on a daily basis. Fresh zeolitic catalyst is added daily at a typical rate of from 1% to as high as 10% of the process unit inventory to maintain the desired activity in the unit. Typically, as fresh catalyst is added to the FCC and TCC unit inventory, the operator to maintain the unit catalyst inventory within the design limits must withdraw equilibrium catalyst from the unit for disposal.

Copending application Ser. No. 08/581,836 of Robert E. Davis and David B. Bartholic discloses a process for improving the activity of zeolitic catalyst containing one or more contaminants which block the pores of the zeolite and adversely affect the activity of the catalyst.

In accordance with such Davis-Bartholic process, a slurry is formed of contaminated zeolitic cracking catalyst and as aqueous solution of a suitable acid, detergent and/or surfactant; the slurry is agitated to solubilize and/or dislodge contaminants which block the pores of the zeolite, and a portion of the solution containing the solubilized and/or solubilized contaminants is withdrawn from the agitated slurry in order to remove such contaminants and prevent them from being redistributed in the pores. The resulting treated catalyst having a reduced level of contaminants and improved activity is then separated from the remaining solution, washed, and recovered for use in a hydrocarbon processing unit.

Surprisingly, I have now determined that the activity of such a contaminated cracking catalyst can be significantly enhanced by a simpler and less expensive process, which is described hereinbelow.

It is believed that much of the deactivation mechanism for zeolitic materials results from zeolitic pore blockage, which can be reversed. This pore blockage can occur during the production stage by the retention of silica or other binding or matrix material in the zeolite pores. The pore blockage can also occur during the processing stage by silica that migrates to the pores, hydrocarbons from the feed or reaction products, or other materials present in the feed, or catalyst itself, that deposit or migrate into the zeolite pores, thereby blocking off access and reducing the activity of the zeolite. There are indications that hydrocarbon material may help to bind the silica and other feed and matrix material in the pores of the zeolite, or only hydrocarbon material may block the pore. This blockage prevents the reactants from entering the zeolite pores and therefore reduces the activity of the zeolite. Another cause of zeolite deactivation is the dehydration of the zeolitic structure.

Based on laboratory work, it is believed that there are various methods for reactivating these zeolitic materials based on (1) chemical treatments, which loosen or solubilize the materials blocking the zeolite pores, and (2) agitation, which aids in mechanically removing the pore blockage material. It is also believed that the dislodged or solubilized contaminant material removed from the pores must be separated from the reactivated product and that the most economical method to accomplish this reactivation in-situ, i.e., in conjunction with the process operations, as is described below.

As will be seen from the following discussion, it is believed that zeolitic FCC and TCC catalysts can benefit from the present invention, because, contrary to popular belief, the major cause of zeolitic catalyst activity decline is zeolite pore blockage which can occur, even during the catalyst manufacturing process, due to free silica or alumina, or compounds of silica or alumina, or other materials which are left behind and block the zeolite pore openings.

The primary objective of the present process is to integrate the reactivation of equilibrium FCC, and TCC, zeolitic catalyst with the unit operations so as to improve the economics. This process eliminates the cost of transporting the catalyst to an off-site location for reactivation and eliminates catalyst disposal costs. Also, by integration of the present reactivation process with the TCC and FCC operations, the costs and environmental problems associated with off-site reactivation will be greatly reduced. Another object of the present invention is to enable the removal of zeolitic catalyst deactivating materials without destroying the integrity of the catalyst and, at the same time, to significantly improve the activity and selectivity of the reactivated equilibrium FCC- and TCC-type zeolitic catalyst and additives. Another object of the present process is to reactivate zeolite-containing equilibrium catalyst using an environmentally safe and acceptable process.

Another object of the present invention is to improve the activity of fresh zeolitic catalyst and additives. Still another objective of the invention is to reduce the requirement for fresh catalyst replacement to an FCC unit, which will reduce fresh catalyst costs, transportation costs, equilibrium catalyst disposal costs, and unit catalyst losses. Other objects of the invention will become apparent from the following description and/or practice of the invention.

SUMMARY OF THE PRESENT INVENTION

The above objects and other advantages of the present invention may be achieved by a process for improving the activity of a contaminated spent zeolite-containing cracking catalyst containing one or more contaminants which block the pores of the zeolite and adversely affect the activity of the catalyst which process comprises:

a. regenerating the spent cracking catalyst by burning carbonaceous deposits therefrom;

b. removing a portion of the regenerated catalyst from the active circulating catalyst inventory of an FCC or TCC process unit;

c. forming a slurry of such portion of the unit catalyst inventory with a liquid containing at least one activating agent selected from the group consisting of acids, detergents and surfactants, the agent being effective to solubilize or dislodge the contaminants;

d. agitating the slurry under activation conditions, including a temperature and a time sufficient to solubilize or dislodge the contaminants;

e. withdrawing the agitated slurry after the contaminants have been solubilized or dislodged and transferring the slurry to a drying stage to obtain a treated, reactivated zeolitie-containing catalyst having a level of activity greater than the activity of the active circulating catalyst inventory; and f. contacting the treated, reactivated catalyst under cracking conditions with hydrocarbon feedstock charged to the unit.

In the present process, the preferred method is to withdraw hot regenerated catalyst from the regenerator of the unit and add it to a liquid solution containing the activating agent so that the hot catalyst will aid in increasing the temperature of the resulting slurry to the desired operating temperature. However, one could withdraw the regenerated catalyst from the FCC regenerator or TCC kiln into a intermediate storage hopper before adding it to the liquid solution. The chemical treatment is normally carried out at between 3 and 7 pH and at a temperature less than 212° F. This chemical treatment may be accomplished with activating agents such as enzymes containing degreasing/surfactants, malic acid, active fluorides, hydroxylamine hydrochloride, and other acidic materials, as well as detergents. One can raise the temperature above 212° F. to help obtain agitation by boiling, but then one must provide for fresh liquid makeup and recovery of the vapors. Another option, if a still higher temperature is desirable, is to conduct the operation under pressure, which is more costly. Increasing the temperature is considered beneficial to the reaction of solubilizing or dislodging the pore blockage materials. It is believed that the cycle time for reactivation can be shortened by increasing the temperature, but temperatures below the decomposition temperature of the reactivating agents, the boiling point of the liquid, and the aggressive attack on the catalytic structure by the activating agents should be employed in this process.

The agitation can be by any suitable method, e.g., stirring, aeration, or tumbling. The preferred method for small particle size materials, such as FCC-type catalyst, is to form a slurry of up to 75% concentration of solids, but more preferably at less than 30% slurry, and to keep the particulate solid suspended in the solution and also keep the maximum surface area of the solid exposed to the fresh chemical reaction by stirring and aeration. For larger particle size zeolitic materials, such as TCC-type zeolitic catalyst, stirring may not be as practical as pumping around the liquid in the contacting vessel so that it flows upward through the bed of pellets/extrudates along with the aeration media. The liquid pumparound may be removed below the upper liquid level and returned to the bottom of the contacting vessel to provide a mixing of the chemical liquid in the contactor and an upward flow of liquid with the aeration media to aid in agitation and stripping of the small particles from the zeolite pores. In either case, the small particles liberated from the zeolitic pores are kept in suspension by the constant agitation.

The time of treatment can be varied from several minutes to many hours, depending on the temperature, chemical concentration, percent solids, particle size of the zeolite material, and the nature of the material blocking the pores. It has been found that the chemical activating agent acts to dissolve and/or loosen the pore blockage material, while the aeration/stirring helps to separate the small particles that have been blocking the pores from the now reactivated zeolite material and to keep these materials suspended in the solution. The addition of surfactants and detergents to aid in the separation and suspension of the small particles may be desirable.

At the end of the reactivation cycle, the agitated slurry is transferred to a drying stage to obtain a treated, reactivated zeolite-containing catalyst having a level of activity greater than the activity of the deactivated circulating inventory. In the drying stage the catalyst is fluidized by a suitable fluidizing medium to separate the contaminants from the catalyst and to vaporize the liquid. In the preferred method, the slurry is transferred back to the circulating catalyst inventory of the unit which is used as the drying stage. This slurry can be added back to the regenerator or another part of the unit. However, it is preferred that the slurry be added back to the reactor section of the unit. It can also be added back to the reactor riser or the reactor vessel itself, where the liquid will be vaporized, leaving behind the reactivated catalyst. The vaporized liquid will exit with the reactor vapors. Any small particles will eventually exit from the reactor or regenerator system as fines. The residual activating agent will either decompose or be combusted in the regenerator.

It is preferred that the agitated slurry be transferred directly to the drying stage without permitting it to settle, so as to keep the contaminant particles suspended in the liquid, thereby reducing the likelihood of the separated contaminants re-entering the zeolite pores.

BRIEF DESCRIPTION OF THE DRAWINGS

The present invention will be more fully understood by reference to the following description thereof read in conjunction with the accompanying FIG. 1 which is a schematic flow diagram of a preferred process in accordance with the present invention.

DESCRIPTION OF PREFERRED EMBODIMENTS

Figure 1:
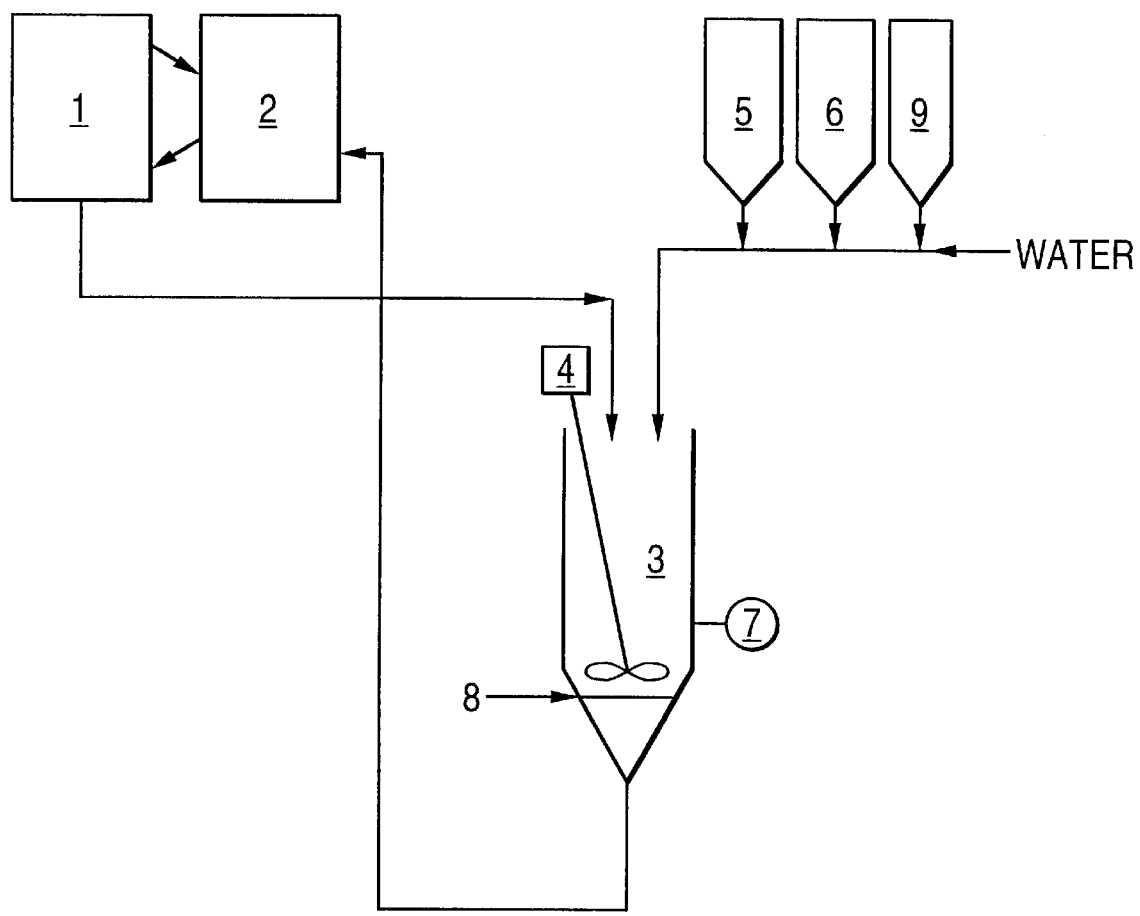

Since one of the largest markets for zeolites is in the manufacture of FCC catalyst, the following process description refers to the reactivation of regenerated FCC catalyst. However, the present invention is applicable to fresh FCC catalyst and additives or equilibrium and fresh TCC type catalyst. It is only necessary that the surface of the zeolite material have a low coke level or be essentially free of coke; that is the coke should be removed by regeneration e.g., contacting spent catalyst with an oxygen-containing gas at elevated temperature to burn the carbonaceous deposits from the catalyst.

The present invention comprises treating zeolite-containing FCC or TCC catalyst in an agitated slurry solution containing a chemical activating agent which has been chosen to loosen or solubilize the materials blocking the zeolite pores, and drying the treated zeolite material. This drying step serves several functions. It is used to vaporize the liquid and obtain the treated, reactivated zeolitic catalyst, while at the same time keeping all or a substantial amount of the dislodged or solubilized small particle size materials removed by chemical treatment/agitation from the zeolite pores from reentering the pores. It is believed that as the liquid is vaporized these small particles or solubilized materials will be dried and separated from the treated catalyst by fluidization, or else they will deposit on the surface, as will any remaining activating agent that is not decomposed or combusted in the drying process, and therefore will not contribute to the deactivation of the treated catalyst.

This liquid chemical treatment to remove the small particles from the pores of the zeolite can be accomplished in conjunction with other processing steps, such as, chemical removal of metals (Ni, V, Na, Fe, etc.) from equilibrium FCC or TCC catalyst, or exchange of the zeolite with rare earth elements or other cations to modify the activity or selectivity of the zeolite.

The first processing stage is to put the pore-blocking material into solution or to loosen the small particles blocking the pores. This may be accomplished by treatment of the zeolite-containing solid particles in an agitated solution containing, as the activating agent, an acid or mixture of acids, followed by drying the treated material and separation of contaminates from the pores of the treated catalyst. In the preferred processing method, the agitation of the acid solution is accomplished by both stirring and aeration. It has been found that use of a combination of acids for treatment is more effective, and this is the preferred method.

As will be evident from the following example, the mechanism of catalyst reactivation is contrary to the beliefs of those working in the catalyst art. Test results obtained by use of the present invention indicate that the method of catalyst deactivation may be contrary to the accepted theory of irreversible zeolite structure collapse resulting from hydrothermal conditions or metals, such as sodium and vanadium, attack. The results of the testing indicate that the method of catalyst deactivation is reversible. While the precise method of catalyst deactivation may not be known, the results of the testing lead to the theory that the primary method of catalyst deactivation is zeolitic pore blockage. This blockage is believed to result from the combination of feed components, such as heavy organic compounds, organometallic compounds or polymerization of zeolitic reaction products in the zeolite cage, and/or catalyst base materials, such as alumina and silica compounds.

The preferred acids for use in the present invention are weak acids, such as malic, acetic and ammonium bifluoride. For example, malic acid may be used to keep the pH at 3.0 or above to minimize the removal or attack on the alumina in the catalyst structure. However, it is believed the malic acid acts to loosen the material blocking the pores of the zeolite but is not strong enough to cause noticeable structural changes in the catalyst. The ammonium bifluoride, it is believed, also helps to loosen the pore blockage material, which appears to be rich in silica. One can use other fluorides to react with the silica, but very active fluorides such as HF are not recommended because of their environmental/safety concerns and their tendency to remove structural silica. Normally the amount of ammonium bifluoride added to the solution will be less than 10 wt % of the catalyst being reactivated and typically will be between 1 and 4 wt %. The malic acid will be normally less than 15 wt % of the catalyst being treated and typically will be between 5 and 10 wt %. As will be seen in one of the examples below, an enzyme, which contained both a detergent and a surfactant, and malic acid were used to reactivate an equilibrium FCC catalyst. In this case, the aeration media used caused a froth that separated the fine particles from the reactivated catalyst. The preferred enzymatic material contains both a surfactant and detergent which attacks the hydrocarbon binding or blocking agent so that the pore-blocking material in the zeolite cage can be removed and thereby reactivate the zeolite. The acid solubilizes, and the stirring/aeration agitation media combines with the surfactant in the enzymatic material to lift the small particles from the zeolite pores. The removal of these fine inorganic particles and/or hydrocarbon materials from the zeolite cage opens the zeolitic channels so that the interior of the zeolite is accessible to the vapor reactants, thereby reactivating the catalyst. It is also believed that the activity of fresh FCC and TCC zeolitic catalyst may be increased by this type treatment to remove any free alumina or silica compounds that might be retained in the pores of the zeolite during manufacture. This would also be the case for any fresh or equilibrium catalyst containing zeolites, such as ZSM-5.

The results of the testing indicate that agitation with air, as well as dispersion of the solid in the solution by stirring, is also highly desirable. It is theorized that finely dispersed bubble agitation of the solids is advantageous in removing the obstructions from the zeolite pores.

The following Example demonstrates the advantages of the present process when used to reactivate a commercial FCC catalyst formed of a silica-alumina matrix containing about 10–20 wt % of a type Y zeolite.

Example A: A sample of 50 gms of regenerated equilibrium FCC catalyst was placed into a solution of 200 ml of deionized water, 20 gms malic acid and 1 ml of a commercial enzyme and heated to about 130° F. in a magnetically stirred beaker for 12 hours. During this time the solution was aerated with compressed air. The combination of the aeration and detergent in enzyme caused a froth phase to develop on the top of the liquid level. The aeration and froth combined to separate the small particles from the reactivated material and conveyed these small particles upward to the beaker top where they were skimmed off. After 12 hours the treated catalyst was filtered and washed to remove any remaining liquid and contaminants and dried.

The equilibrium catalyst (before treatment) and the reactivated catalyst (after treatment) were each tested on a Micro Activity Testing (MAT) unit at a 3.1 catalyst to oil ratio, 16 WHSV, 960 F. using a standard gas oil. The fresh catalyst activity and the analytical results for the untreated starting catalyst and the treated catalyst are detailed below: (two numbers indicate two tests)

|  | BEFORE TREATMENT | | AFTER TREATMENT | |
| --- | --- | --- | --- | --- |
| FRESH ACTIVITY | 2.8 | | | |
| CATALYST ACTIVITY | 1.4 | 1.4 | 2.3 | 1.9 |
| MICRO ACTIVITY TEST: | | | | |
| CONVERSION | 59 | 59 | 70 | 66 |
| COKE FACTOR | 1.8 | 3.1 | 1.4 | 1.7 |
| GAS FACTOR | 12.1 | 5.3 | 2.2 | 4.9 |

After extensive laboratory testing on zeolite reactivation to determine the proper procedure, five samples of equilibrium catalyst were obtained from five different operating FCC units. Each of these five equilibrium catalyst samples were more than likely mixtures of different types of fresh catalyst from different suppliers, since most FCC units change the type of fresh catalyst they add and also add outside equilibrium catalyst on occasion. However, it is known that these five samples of equilibrium catalyst have a very broad range of activities and metals levels (Ni/V) since these units operate on feeds which range from gas oil to residual oil operations. However, the fresh catalyst added to these units would typically have 20–30% of a Y or USY zeolite with different levels of active matrix. All of the five samples were treated in the following manner:

1. Regenerated the as received equilibrium catalyst in a muffle furnace at 1250 F. for 4 hours using an oxygen-containing gas.
2. Added 100 gms of the regenerated equilibrium to 500 cc of deionized water.
3. Added 4 gms of hydroxylamine so that pH was between 3.8 and 4.0 at 71 F. The hydroxylamine is used as a reducing agent, mainly to reduce the nickel on the catalyst.

4. Sample from step 3 was placed on magnetic stirrer-hot plate. At 125 F. added 2 gms ammonium bifluoride and 10 gms malic acid (pH of 3.0) and raised temperature to about 150 F.
5. After 2 hours at between 125 F. and 150 F., removed sample from stirrer-hot plate, and allowed the sample to settle until the majority of catalytic material was out of suspension but the fine particle size and colloidal material was still in solution, and decanted the sample to remove the fine particles that were still in solution.
6. Washed the decanted sample 3× with 300 ml of deionized water and decanted after each wash as described in 5 above. Samples of each of the five reactivated equilibrium samples was tested and the results are shown below.
7. 40 gms of each of the five washed reactivated samples from step 6 were exchanged with 3.64 gms of a rare earth element solution (27.46% rare earth element oxides consisting of 12.23 La2O3, 7.22% CeO2, 5.64% Nd2O3, 1.95% Pr6O4) in 100 cc of deionized water. After 2 hours at 190 F., the now rare earth exchanged reactivated samples were washed 2× with 150 cc of deionized water and dried overnight in a drying oven and put in the muffle furnace for 1 hour at 1000 F.
8. The regenerated equilibrium catalyst, the reactivated samples from step 6 and the rare earth exchanged samples from step 7 were tested as detailed below.

The testing was done on a Micro Activity Testing (MAT) unit at a 3:1 catalyst to oil ratio, 16 WHSV, 960 F. using a standard gas oil. Samples A and C were equilibrium catalyst from FCCU's operating on residual oil. The results of the MAT testing indicated the following:

| SAMPLE | MAT TEST RESULTS | | |
|---|---|---|---|
| | ACTIVITY | COKE FACTOR | GAS FACTOR |
| A REGENERATED EQUILIBRIUM | 0.75 | 7.63 | 2.04 |
| A REACTIVATED | 1.16 | 4.36 | 1.33 |
| A RARE EARTH EXCHANGED | 1.34 | 4.29 | 1.01 |
| B REGENERATED EQUILIBRIUM | 1.23 | 2.28 | 1.58 |
| B REACTIVATED | 1.56 | 2.23 | 1.53 |
| B RARE EARTH EXCHANGED | 1.72 | 2.32 | 1.69 |
| C REGENERATED EQUILIBRIUM | 1.02 | 4.71 | 1.50 |
| C REACTIVATED | 1.25 | 4.39 | 1.12 |
| C RARE EARTH EXCHANGED | 1.56 | 3.75 | 0.97 |
| D REGENERATED EQUILIBRIUM | 1.36 | 3.89 | 1.33 |
| D REACTIVATED | 2.06 | 3.01 | 1.14 |
| D RARE EARTH EXCHANGED | 1.70 | 3.91 | 1.45 |
| E REGENERATED EQUILIBRIUM | 1.01 | 1.52 | 1.21 |
| E REACTIVATED | 1.29 | 2.48 | 1.07 |
| B RARE EARTH EXCHANGED | 1.20 | 3.29 | 1.17 |

The MAT results above not only show an increase in activity for all of the reactivated samples, but also indicate a selectivity improvement in the reactivated catalyst as compared to the regenerated equilibrium. Samples A, B, and C indicate that there was available zeolite that exchanged with the rare earth elements, which resulted in increased activity and selectivity. Based upon these results, it is believed that the mechanism for zeolitic catalyst reactivation is the removal of small particle size material from the zeolitic pores. An analysis of this material indicated it is rich in silica along with the other components of the catalyst including alumina, nickel, and vanadium. It is theorized that the pore blockage material is deposited in the pores of the zeolite during the manufacture of the fresh catalyst and by the migration of silica during operation of the processing unit.

The above data indicates that contrary to popular belief, the activity and the selectivity of regenerated FCC catalyst can be greatly improved. Therefore, by practice of the present invention one can remove what is commonly referred to as equilibrium zeolitic catalyst from the processing unit, treat the catalyst as disclosed herein and reuse the treated catalyst having an improved activity and selectivity.

It is believed that the key to a successful zeolitic catalyst reactivation process is removing the zeolitic pore blockage material from the pores of the zeolite and separating this material from the reactivated zeolitic catalyst. The foregoing demonstrates that the material blocking the pores can be loosened by mild acids or combinations of acids that are reactive with the pore blockage material. The laboratory data also indicates that a mixture of mild acids such as ammonium bifluoride and malic acid at pH of 3 to 5 takes less time than malic acid on its own.

ZEOLITIC CATALYST REACTIVATION PROCESS

In a commercial operation using the zeolitic reactivation process of the present invention an essentially carbon free, regenerated, FCC or TCC equilibrium catalyst is mixed with a chemical solution containing the activating agent(s) in an agitated contactor vessel to form a slurry. After a designated period at the desired temperature, the reactivated slurry solution is transferred to a drying stage. The reactivated slurry solution contains the reactivated catalyst, residual activating agent(s), water, and solubilized and/or dislodged contaminant particles in suspension. Most preferably, the agitated reactivated slurry is transferred directly to a fluidized drying stage. That is, the agitated slurry should not be permitted to settle, since this provides an opportunity for the dislodged pore blocking particles to be redistributed in the zeolite pores before being transferred to the drying stage. By maintaining the agitation of the slurry, these fine particles can remain suspended in the solution. In the drying stage, the water is vaporized, the residual reactivating agent is decomposed, combusted, and/or the components of the activating agent are deposited on the surface of the reactivated catalyst. The solubilized or dislodged fine particles are dried and separated by fluidization in the drying stage from the treated, reactivated catalyst.

A commercial FCC or TCC catalyst reactivation process would comprise contacting a regenerated catalyst in an agitated (stirred or aerated) chemical solution containing an activating agent, that consists of a mild acid, such as malic, or a mixture of mild acids such as malic and ammonium bifluoride in a contacting vessel. After a period of time at the desired temperature, the treated activated FCC catalyst slurry solution is transferred directly to the reactor system of the FCU or TCC unit, where the heat from the circulating catalyst will vaporize the water, decompose or cause the components of the activating agent to deposit on the surface of the circulating catalyst to be combusted in the regenerator, and separate by fluidization the fine particles dislodged from the pores of the zeolite during the reactivation from the reactivated catalyst. Eventually these fines will leave the unit, as will the other components of the slurry solution except for the reactivated catalyst, with the regenerator or reactor exit gases and vapors.

Large sized zeolitic materials, such as the pelleted or extruded zeolitic TCC catalyst, can also be treated in stirred vessels. However, other forms of agitation, such as tumbling or ebulating beds, or only recirculation of the chemical solution to the bottom of the vessel to give a continuous upward flow of chemical in conjunction with the aeration media can also be used if desired.

The preferred aeration media in any embodiment of the present reactivation process is air, but other gases, such as nitrogen or light hydrocarbon gases, which will act along with the activating agent and the agitation may be used to maintain the dislodge particles in suspension.

FIG. 1 illustrates a preferred process flow for the practice of the present invention. Those skilled in the art may know of other equipment which may be employed in the process. It is important, however, that the equipment selected perform the functions described herein so that the desired reactions and results are obtained. In the preferred batch process diagramed in FIG. 1, reaction vessel 3 is filled with the desired weight of water, and activating agents from storage hoppers 5 and 6 to get the desired pH on pH indicator 7. Once the liquid level is established in reaction vessel 3, agitator 4 is commissioned and the desired weight of hot regenerated zeolitic FCC catalyst from FCC regenerator 1 to reaction vessel 3 is added to the liquid. In the preferred operation, hot regenerated FCC catalyst is withdrawn from the regenerator active catalyst inventory utilizing the device described in my U.S. Pat. No. 5,464,591, "Process and Apparatus for Controlling and Metering the Pneumatic Transfer of Solid Particulates". However, reaction vessel 3 can be equipped with load cells so that all of the liquid, catalyst, and activating agents could be added on weight. The hot regenerated catalyst is then added to the liquid activating agent, which is composed of water containing the desired amounts of mild acids, which are effective to dislodge and/or solubilize the pore-blocking contaminants in the zeolite pores. Reaction vessel 3 is agitated by mechanical stirrer 4 and air from line 8, which is injected into the bottom of the liquid through a distribution grid. Malic acid or a mixture of malic and ammonium bifluoride from storage hopper 5 and 6 is added into reaction vessel 3 on weight control to control the pH at between 3 and 7, with a pH of about 5.2 being preferred. A surfactant/detergent from storage tank 9 is added on weight control to control the concentration within a suitable range, which may be from about 1 ppm to 10 wt %, depending on the catalyst and conditions employed in reaction vessel 3. Such a surfactant and/or detergent forms a foam to aid in maintaining the small contaminant particles in suspension. If one uses a surfactant/detergent along with the agitation, the evidence of foam on the top of the liquid level in reaction vessel 3 will indicate there is sufficient active surfactant/detergent in the chemical solution. Therefore, if at any time during this batch process the foam disappears then more surfactant/detergent can be added to restore the surfactant/detergent action which aids in the removal by suspension of the small contaminant particles liberated from the zeolitic pores. Those skill in the art will know that this system can be completely automated and vessels 5, 6, 9, and 3 can all be equipped with load cells.

Reaction vessel 3 can be operated at ambient temperature, but it is preferred to operate at from about 1300° F. to 2000° F. but in no case at a temperature that will kill the surfactant/detergent activity or result in aggressive attack of the catalyst particle. The temperature in reaction vessel 3 can be controlled by an external heat source, such as, a steam coil or jacket on the vessel. Depending on the type of zeolitic material being treated and the chemicals and temperature employed in the processing, the treatment time can be as low as 10 minutes and as long as 36 hours, with 4 to 12 hours being normal.

If air emissions are a concern, the aeration supply 8 can be a closed system, if desired.

After the reactivation process is complete, the agitated slurry solution is transferred from the bottom of reaction vessel 3 directly to the FCC unit. While it can be transferred to any part of the unit, it is preferred that the slurry be added to the FCC reactor system 2, which serves as the fluidized drying stage.

Testing has indicated that the efficiency of this reactivation process can be improved by the addition of a suitable concentration of ammonium bifluoride to the activating liquid to aid in the removal of free silica from the pores of the zeolite.

An example of the commercial application of this process is a 25,000 BPD FCU that operates on residual oil, which requires the addition of 1 # of fresh catalyst per barrel of feed to maintain the activity and level on the equilibrium catalyst at the desired level. This requires 25,000 pounds (12.5 tons) per day of fresh catalyst. At a delivered price of $1500/ton, the fresh catalyst costs are $18,700.00 per day or $0.75 per barrel of feed. Add to this the disposal cost of $200/ton, and the costs approach $0.85 per barrel of feed. It is estimated that the use of the present process would require the reactivation of 16,000 #/day, which would reduce the fresh catalyst consumption to about 6000 #/day since about 30% of the fresh catalyst added to the unit is lost as water vapor or fines. That is, of the 25,000 #'s added to the unit, only 17,500 #'s (70%) is effective. This would reduce the fresh catalyst costs to $4500/day or $0.18/bbl. Since the reactivated catalyst should not have any losses, the 6000 #/day should be able to maintain the unit inventory and makeup for any activity differences between the fresh and reactivated catalyst. If one removes 16,000 #'s per day of regenerated catalyst from regenerator 1 into reaction vessel 3 to result in a slurry concentration of 25%, the resultant temperature of the slurry in reaction vessel 3 will be about 180° F. Therefore, if one insulates reaction vessel 3 there is not a need to add much, if any, heat during the reactivation cycle. After, the reactivation cycle is complete, the slurry can be added back to reactor 2. If the slurry is transferred to the FCC reactor or regenerator over an hour period, the result will be to increase the catalyst circulation by between 5 and 6 t/m. This will be an increase of about 20 to 25% in the catalyst circulation rate. If this is not acceptable, the transferring time can be increased, as desired, for up to 24 hours. Not counting capital costs, the operating costs associated with an the above-described on-site, or integrated, FCC or TCC catalyst reactivation plant should be less than half the costs of the fresh catalyst, so the refiner in this case could save upwards of $3,000,000.00 per year.

While the foregoing description of the present invention has been given with reference to a batch-type catalyst reactivation process, those skilled in the art will recognize that the present process can be operated on a continuous basis, using the continuous addition of regenerated catalyst to reaction vessel 3 and continuously withdrawing agitated slurry therefrom for transfer to a fluidized drying stage as described above.

Having described preferred embodiments of the present invention, it is to be understood that variations and modifications thereof falling within the spirit of the invention may become apparent to those skilled in this art, and the scope of the invention is to be determined by the appended claims and their equivalents.

As described above, the preferred fluidized drying stage is the reactor or regenerator section of the FCC or TCC unit; however it will be understood by those skilled in the art that other fluidized drying systems, e.g., a catalyst spray drier or catalyst calciner may be used instead to effect the drying of the slurry and separation of the fine contaminant particles from the treated reactivated catalyst. Most preferably, the present process is integrated with a processing unit, but there may arise some situations where it is desirable to take the regenerated catalyst off-site for reactivation by the present process.

What is claimed is:

1. A process for increasing the activity of a zeolite-containing particulate cracking catalyst containing contaminants which block the pores of the zeolite and adversely affect the activity of the catalyst, which process comprises:
   a. regenerating spent cracking catalyst used in a hydrocarbon cracking unit to remove carbonaceous deposits therefrom;
   b. removing a portion of the regenerated catalyst from a circulating catalyst inventory of the unit;
   c. forming a slurry of said portion of the regenerated the catalyst with a liquid containing at least one activating agent selected from the group consisting of acids, detergents and surfactants, said agent being effective to solubilize or dislodge the contaminants;
   d. agitating the slurry in an agitation zone under activation conditions effective to solubilize or dislodge the contaminants from the catalyst and suspend said contaminants in said liquid;
   e. withdrawing the agitated slurry containing the solubilized or dislodged contaminants, or both, suspended in the liquid from the agitation zone, transferring the withdrawn slurry to a fluidized drying stage without permitting the slurry to settle and subjecting the transferred slurry containing the suspended contaminants to fluidization effective to evaporate the liquid and separate or deposit on the catalyst surface the solubilized or dislodge contaminants from the catalyst and thereby obtain a treated, reactivated zeolite-containing catalyst having a level of cracking activity greater than the cracking activity of the active circulating catalyst inventory.

2. The process of claim 1, wherein the regenerated catalyst is an FCC catalyst.

3. The process of claim 1, wherein the regenerated catalyst is a TCC catalyst.

4. The process of claim 1, wherein the regenerated catalyst contains a zeolitic additive.

5. The process of claim 1, wherein the solubilized or dislodged contaminants are removed from the process by fluidization.

6. The process of claim 1, wherein the activating agent is malic, ammonium bifluoride, acetic, maleic, citric, formic, oxalic, hydrochloric, nitric, or sulfuric acid, an enzyme, a surfactant, a detergent or a mixture of any thereof.

7. The process of claim 1, where the activating conditions include an elevated temperature below 212° F., but not greater than the deactivation temperature of said agent.

8. The process of claim 1, further including contacting the treated, reactivated catalyst with a hydrocarbon feedstock in said unit.

9. A process for increasing the activity of a zeolite-containing FCC catalyst containing contaminants which block the pores of the zeolite and adversely affect the activity of the catalyst, which process comprises:
   a. removing a portion of the regenerated FCC catalyst from a circulating catalyst inventory of an FCC unit;
   b. forming a slurry of said portion of the regenerated catalyst with a liquid containing at least one activating agent selected from the group consisting of acids, detergents and surfactants, said agent being effective to solubilize or dislodge the contaminants;
   c. agitating said slurry under activation conditions, including a temperature and time sufficient to solubilize or dislodge the contaminants in an agitation zone;
   d. withdrawing the agitated slurry from the agitation zone after the contaminates have been solubilized or dislodged; and
   e. transferring said withdrawn slurry containing the solubilized or dislodged, contaminants, or both, suspended in the liquid without permitting the slurry to settle to the FCC unit circulating catalyst inventory and fluidizing the transferred slurry containing the suspended contaminants in the FCC unit to evaporate the liquid and separate or deposit on the catalyst surface the solubilized or dissolved contaminants from the catalyst and thereby obtain a treated zeolite-containing FCC catalyst having a level of activity greater that the activity of the deactivated circulating catalyst inventory and to contact the treated catalyst with hydrocarbon feedstock charged to the FCC unit.

10. The process of claim 9, wherein the solubilized or dislodged contaminants are removed from the process by fluidization.

11. The process of claim 9, wherein the agent is malic, ammonium bifluoride, acetic, maleic, citric, formic, oxalic, hydrochloric, nitric, or sulfuric acid, an enzyme, a surfactant, a detergent or a mixture of any of said agents.

12. The process of claim 9, wherein the activation conditions include an elevated temperature below 212° F., but not greater than the deactivation temperature of said agent.

13. The process of claim 9, wherein the slurry is transferred to the reactor section of an FCU.

14. The process of claim 9, wherein the slurry is transferred to the regenerator section of an FCU.

15. The process of claim 9, wherein said slurry further contains fresh catalyst or FCC additives with the equilibrium catalyst.

16. The process of claim 1 or 9, where the agitation is effected mechanically, by the introduction of gas into the slurry, or a combination thereof.

17. The process of claim 1 or 9, wherein the treated catalyst is subjected to a rare earth element exchange process to introduce one or more rare earth elements into the zeolite.

18. The process of claim 1, wherein regenerated catalyst is continuously removed from said active circulating catalyst inventory, and said agitated slurry is continuously transferred to said fluidized drying stage.

* * * * *